United States Patent [19]
Bitter

[11] Patent Number: 4,837,055
[45] Date of Patent: Jun. 6, 1989

[54] SUPPORTED MEMBRANE AND PROCESS FOR ITS PREPARATION

[75] Inventor: Johan G. A. Bitter, Amsterdam, Netherlands

[73] Assignee: Shell Oil Company, Houston, Tex.

[21] Appl. No.: 189,280

[22] Filed: May 2, 1988

Related U.S. Application Data

[62] Division of Ser. No. 906,051, Sep. 11, 1986, Pat. No. 4,769,263.

[30] Foreign Application Priority Data

Sep. 16, 1985 [GB] United Kingdom ................ 8522847

[51] Int. Cl.$^4$ .......................... B32B 7/00; B05D 5/00; B05D 3/02; B01D 13/00
[52] U.S. Cl. ............................. 427/244; 210/500.25; 210/500.26; 210/500.27; 210/500.34; 427/387; 427/388.5; 427/393.5
[58] Field of Search ..................... 210/500.25, 500.26, 210/500.34, 500.27; 427/244, 387, 385.5, 388.5, 393.5; 428/36, 109, 137, 138, 255, 256, 266, 269, 421, 423.1, 425.6, 247

[56] References Cited

U.S. PATENT DOCUMENTS

| | | |
|---|---|---|
| 1,693,890 | 12/1928 | Duclaux . |
| 1,720,670 | 7/1929 | Duclaux . |
| 2,944,017 | 7/1960 | Cotton ................................ 210/500 |
| 3,721,596 | 3/1973 | Drake .................................. 156/181 |
| 4,610,918 | 9/1986 | Effenberger ....................... 428/245 |
| 4,673,613 | 6/1987 | Ward ................................... 428/247 |
| 4,685,987 | 8/1987 | Fick .................................... 156/247 |

Primary Examiner—Michael Lusignan
Attorney, Agent, or Firm—Kimbley L. Muller

[57] ABSTRACT

A supported membrane comprising a non-woven monofilament support layer wherein dense membranes with a maximum width of 5000 μm are surrounded by filaments. The invention further relates to a process for the preparation of said supported membranes.

12 Claims, No Drawings

SUPPORTED MEMBRANE AND PROCESS FOR ITS PREPARATION

This is a division, of application Ser. No. 906,051, filed Sept. 11, 1986, now U.S. Pat. No. 4,769,263, patented Sept. 6, 1988.

FIELD OF THE INVENTION

The invention relates to a supported membrane and a process for its preparation.

BACKGROUND OF THE INVENTION

It is known to form membranes in the aperture of a loop or a series of loops with opening widths of 2.5–7.5 cm, or between at least two substantially parallel filaments spaced at a distance of less than 2.5 cm to define elongated apertures having lengths which greatly exceed the distance between said filaments. The resulting membranes each have a substantial surface area which is free of support material and are quite vulnerable to rupture caused by the pressure differences applied across such membranes in reverse osmosis processes.

It is further known to use woven cloth as support for membranes having a thickness substantially equal to the cloth which is twice the thickness of the yarns forming the cloth at crossover points in the cloth weave. Due to said membrane thickness the flux of a permeable compound through the membrane will be unacceptably low in many cases.

For many applications it would be desirable to have at one's disposal dense (i.e. non-porous) thin membranes (permitting high rates of flow therethrough) which possess sufficient strength to be applied in industrial separation processes.

It has now been found that excellent supported membranes can be provided by locating dense membranes in the openings of a non-woven monofilament support layer.

SUMMARY OF THE INVENTION

The invention therefore relates to a supported membrane comprising a non-woven monofilament support layer wherein dense membranes having a maximum width of about 5000 $\mu$m are surrounded by the filaments of the support layer.

The invention further relates to a process for preparing a supported membrane which comprises coating a non-woven monofilament support layer with a solution comprising a (pre) polymer in a suitable solvent, removing at least part of the solvent from the coated layer and allowing dense membranes to be formed in areas surrounded by monofilaments.

DETAILED DESCRIPTION OF THE INVENTION

The dense membranes suitably have a width from 5–2000 $\mu$m, and preferably from 5–500 $\mu$m for most applications. Membranes which have a width of more than 5000 $\mu$m between opposite filaments of the support layer will tend to rupture even at a small pressure difference between the two sides of such a membrane, unless the membrane thickness is considerable which is undesirable for most applications.

The thickness of the dense membranes present in the supported membrane according to the invention is less than their width and suitably less than the thickness of the filaments; preferably the thickness of the dense membranes is less than 25 $\mu$m, most preferably less than 10 $\mu$m.

Although very small membranes (having a width of e.g. less than 5 $\mu$m) can usually withstand high pressure differences (e.g. above 100 bar) between both sides, even when their thickness is only a few $\mu$m, their surface area is usually less than 5 percent of the total surface area of the supported membrane which is too low for most applications.

The support layer may comprise any type of non-woven monofilaments which possess sufficient strength and regularity (thickness and surface smoothness) provided that the monofilaments are substantially non-soluble in the membrane-forming compound itself and in suitable solvents for said compound. Moreover, the monofilaments should preferably be compatible with (pre) polymer solutions which are suitably used to form the dense membranes in the supported membranes according to the invention, in order to attain a substantially complete coating of the monofilaments by said solutions.

Suitable non-woven monofilament support layers comprise a polymeric-, glass fiber- and/or metallic (e.g. steel) mesh; a preferred combination of said materials is a polymer-coated steel mesh having openings of substantially equal size. Preferred polymeric compounds include polyesters, such as DACRON and TERYLENE; polyalkylenes which may comprise halogen moieties, such as polytetrafluoroethylene, and cellulose derivatives (e.g. cellulose acetate or nitro cellulose).

A main advantage of the supported membranes according to the invention, compared with membranes comprising a porous supporting layer extending over the surface of a dense membrane layer, is the possibility to maintain fluid flows directly along both sides of the dense membranes which are now located in the support, thereby substantially reducing or even eliminating concentration polarization in the fluid layers adjacent to the membrane surfaces. Consequently, the supported membranes according to the invention can be advantageously applied in dialysis processes wherein the concentration gradient in a plane perpendicular to the membrane surface provides the driving force for the transport of a particular compound through the membrane. Furthermore, said supported membranes are excellently suited for application in reverse osmosis processes due to their inherent strength, in particular when the dense membranes have a width from 5–100 $\mu$m, which makes it possible to maintain pressure differences of more than 10 bar, or even 100 bar, between both sides of the membranes.

The supported membranes according to the invention may be used in any configuration known in the art e.g. in the form of flat sheets; preferably, the supported membranes are spirally wound in such a manner that a fluid flow can be maintained along both sides of the dense membranes. Spacers, such as a mesh, a perforated sheet or a porous layer, may be applied between the supported membranes in spirally wound modules.

A wide variety of (pre) polymers can be applied for the dense membranes which are present in the supported membrane according to the invention. The applied polymers may either comprise thermoplastics, such as polyalkylenes (in particular polypropylene) or thermo-hardening compounds, such as (silicone) rubbers, resins or fluoro-elastomers (e.g. polydimethyl siloxane, polyurethane, styrene-butadiene-styrene rubber or fluoro silicone elastomer).

In order to obtain substantially hole-free supported membranes, it is important that a good wetting of the monofilaments is effected by the (pre) polymer solution. Depending on the combination of monofilament material and polymer solution, treatment of the support layer with a surface active agent such as stearinic acid or polyisobutylene maleic acid anhydride triethylene pentaacetate before coating with the (pre) polymer solution can be advantageous.

Alternatively, a surface active agent can be suitably added to the polymer solution.

The concentration of (pre) polymer in the polymer solution may be chosen within a wide range, suitably within a range from 1-50% by weight of polymer in solvent, depending on the types of polymer and solvent applied. In case the surface tension of the polymer solution is relatively high, it can be advantageous to use a relatively concentrated polymer solution in order to prevent the formation of holes in the areas of the coated support layer where dense membranes are to be formed. For instance, in case a solution of polypropylene in a solvent with relatively high viscosity and boiling point (e.g. decaline) is applied, the concentration of polypropylene in said solvent is preferably at least 5% by weight.

The support layer may be coated e.g. by submerging the layer in the polymer solution or by spraying polymer solution on the layer which is then suitably supported by solid or liquid supporting means.

Solvent is suitably removed, after coating of the support layer with the polymer solution, be evaporation, preferably at an elevated temperature. In some cases it is possible to remove at least part of the solvent by placing the coated support layer on or in a body of liquid wherein the solvent is soluble and wherein the polymer coating is insoluble.

Preferably, solvent is removed from the coated support layer at an elevated temperature at which no phase separation occurs in the (pre) polymer coating from which the dense membranes are to be formed. In particular when a polypropylene solution is used for preparing dense membranes therefrom, it is important that the temperature should not fall below 120° C., and preferably not below 140° C., during coating of the support layer and during the subsequent evaporation step; in order to avoid crystallization of polypropylene which would give rise to unacceptable pore formation in the membranes thus formed.

After having removed at least part, and preferably substantially all of the solvent from the coated supporting layer, a further heat treatment may be applied in particular when thermo-hardening polymers are used, suitably in combination with catalysts and/or cross-linking agents, in the coating. Suitably, the heat treatment is carried out at a temperature from 100°-160° C. for a period of 30 minutes-24 hours.

The invention will be further illustrated by means of the following Examples.

EXAMPLE 1

A non-woven monofilament polyester mesh comprising openings having a width of 49 $\mu$m was, after cleaning with n-hexane, submerged at a temperature of 20° C. in a solution comprising 2.5% by weight of a styrene/butadiene/styrene block copolymer dissolved in cyclohexane, dried at 50° C. and again submersed in said solution and dried at 50° C. The resulting supported membrane contained 18 g copolymer/m$^2$ mesh, permitting a carbon dioxide gas flux of 120 m$^3$ (S.T.P.)/bar,m$^2$,day through the dense membranes formed in the mesh openings.

EXAMPLE 2

A similar cleaned polyester mesh as described in Example 1 was submerged in a solution comprising 5% by weight of polypropylene and 1% by weight of stearinic acid in decalin at a temperature of 150° C. which was maintained during drying of the coated mesh. Accordingly, dense membranes were obtained which covered 20% of the total supported membrane area, the remaining area being covered by the monofilaments of the mesh; the coating amounted to 14 g polypropylene/m$^2$ mesh.

In dialysis experiments carried out with the supported dense membrane at a temperature of 55° C., a flux of n-hexane and n-octane amounting to 0.41 and 1.27 m$^3$/m$^2$,day, respectively, was obtained.

EXAMPLE 3

A steel mesh comprising openings having a width of 2 mm was cleaned with n-hexane and then submerged in a polypropylene-comprising solution as described in Example 2. During drying at 150° C. of the steel mesh coated with 23 g polypropylene/m$^2$ mesh dense membranes were formed which covered 80% of the total surface area of the supported membrane.

In dialysis experiments carried out with said supported membrane at a temperature of 55° C., fluxes of n-hexane and iso-octane amounting to 0.30 and 0.14 m$^3$/m$^2$,day, respectively, were obtained.

EXAMPLE 4

A polytetrafluoroethylene mesh having openings with a width of 50 $\mu$m was cleaned with n-hexane and subsequently submerged in a solution comprising 2.5% by weight of poly dimethyl siloxane and 1% by weight of polyisobutylene maleic acid anhydride triethylene pentaacetate in isooctane, dried at 50° C. and cured at 120° C. for 4 hours.

The resulting supported membrane showed excellent adhesion between the coating and the mesh after wetting with n-hexane.

What is claimed is:

1. A process for preparing a dense hole-free membrane supported on a non-woven monofilament support layer, which process comprises coating a non-woven monofilament support layer with a solution of a polymer in a solvent, the polymer selected from the group consisting of polyalkylene, polydimethyl siloxane, polyurethane, and styrene-butadiene-styrene rubber, removing at least part of the solvent from the coated layer and forming a dense hole-free membrane having a maximum width of about 5000 $\mu$m and a thickness less than about 25 $\mu$m in areas surrounded by the monofilaments of the support layer.

2. The process of claim 1 wherein coating the support layer comprises submerging the layer in the solution of a polymer.

3. The process of claim 2 wherein removing the solvent from the coated support layer comprises evaporating the solvent at an elevated temperature.

4. The process of claim 1 a surface active agent is added to the polymer solution.

5. The process of claim 4 wherein the surface active agent is selected from the group consisting of stearinic acid and polyisobutylene maleic acid anhydride triethylene pentaacetate.

6. The process of claim 1 wherein the polymer is polypropylene and wherein the coating temperature and solvent removing temperature is above about 140° C.

7. The process of claim 5 wherein the polymer is polypropylene and wherein the coating temperature and solvent removing temperature is above about 120° C.

8. The process of claim 7 wherein the non-woven support layer is a polyester mesh and the surface active agent is stearinic acid.

9. The process of claim 7 wherein the non-woven support layer is a steel mesh and the surface active agent is stearinic acid.

10. The process of claim 1 wherein the non-woven support layer is polyester mesh, the polymer is styrene-butadiene-styrene rubber and the solvent is cyclohexane.

11. The process of claim 5 which further comprises heat treating the membrane, after removing the solvent, at a temperature from about 100° C. to about 160° C. for a period from 30 minutes to 24 hours.

12. The process of claim 11 wherein the non-woven support layer is a polytetrafluoroethylene mesh, the polymer is polydimethyl siloxane, the solvent is isooctane, the surface active agent is polyisobutylene maleic acid anhydride triethylene pentaacetate, the temperature of heat treating is 120° C. and the period of heat treating is 4 hours.

* * * * *